(No Model.)
M. B. PARKER & M. T. SMITH.
COCKLE SCREEN AND WHEAT GRADER.
No. 248,786. Patented Oct. 25, 1881.
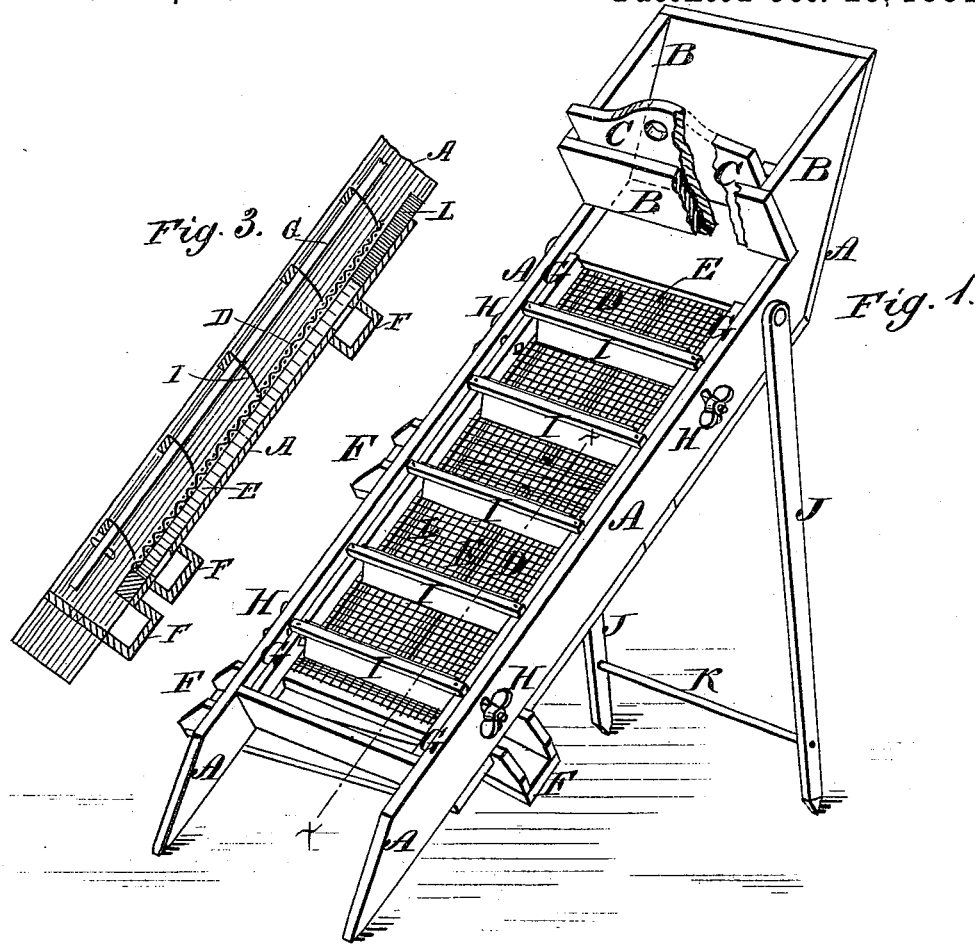
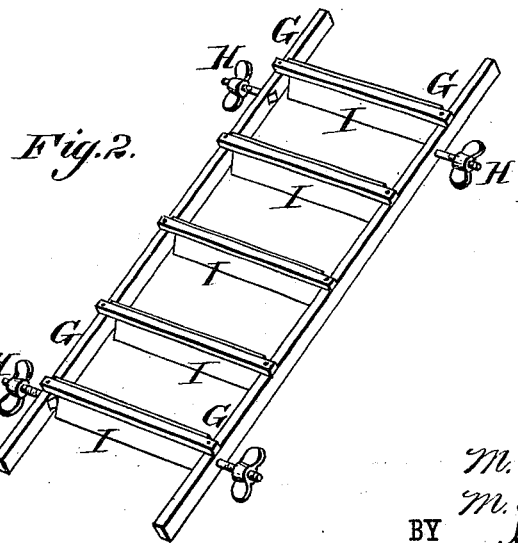
WITNESSES:
Donn Twitchell
C. Sedgwick
INVENTOR:
M. B. Parker
M. T. Smith
BY Munn & Co
ATTORNEYS.

UNITED STATES PATENT OFFICE.

MARTIN B. PARKER AND MYRON T. SMITH, OF BLUE EARTH CITY, MINN.

COCKLE-SCREEN AND WHEAT-GRADER.

SPECIFICATION forming part of Letters Patent No. 248,786, dated October 25, 1881.

Application filed July 18, 1881. (No model.)

*To all whom it may concern:*

Be it known that we, MARTIN B. PARKER and MYRON T. SMITH, of Blue Earth City, in the county of Faribault and State of Minnesota, have invented a new and useful Improvement in Cockle-Screens and Wheat-Graders, of which the following is a full, clear, and exact description.

Figure 1 is a perspective view of our improvement. Fig. 2 is a perspective view of the top frame. Fig. 3 is a longitudinal section, through the line $x\ x$, of the lower portion of the device.

The object of this invention is to facilitate the separating of grain from cockle and other small seeds, and to separate the grain into grades.

Our improvements relate to that class of grain-cleaning devices in which an incline frame supporting a screen is combined with a gang of transverse blades or retarding-bars placed above the screen and made adjustable to or from the same.

Our improvement consists in the combination of the inclined chute-frame, the screen located therein, a subjacent longitudinal rib or stay supporting the middle line of the screen, and the adjustable frame carrying cross-bars provided with flexible aprons arranged above the screen, as hereinafter more fully described.

A represents the frame of the grader, which is made with a close bottom and has a hopper, B, attached to the upper end. The forward side of the hopper B does not extend quite to the bottom of the frame A, a space being left for the passage of the grain. The size of the discharge space or opening of the hopper B is regulated by a slide, C, placed against the inner surface of the said forward side, so that it can be raised and lowered as required.

D is a screen, the frame of which fits removably or otherwise into the frame A and rests upon each side on strips L, Figs. 1 and 3, attached to or formed upon the said frame, so as to leave a space between the said screen and the closed bottom of the frame A.

To the bottom of the frame A are attached one or more longitudinal ribs, E, to prevent the screen-cloth from sagging, and thus coming in contact with the bottom of the frame A.

This rib E also serves the further important function of holding the screen up to the straight line of the lower edge of the flexible aprons or flaps I against the weight of the grain, thus rendering the coaction of the apron and the screen perfect throughout the length of said apron, and avoiding the tendency of the screen to bag, which throws the grain to the middle line, as in a trough.

In the bottom of the frame A are formed one, two, or more cross-slots, beneath which are secured inclined spouts F, leading out at the sides of the frame A, the lowest spout being below the lower end of the screen D, as shown in Fig. 1.

Within the frame A is placed a frame, G, which is secured to the said frame A by screws H, so that it can be raised and lowered to adjust it closer to and farther from the screen D, as may be required. The frame G is made with a number of cross-slats, to each of which is attached a flap or apron, I, of rubber, cloth, leather, or other flexible material, the free edge of which rests upon the screen D, as shown in Fig. 1.

The upper end of the frame A is supported by bars J, the upper ends of which are pivoted or hinged to the said frame A, and their lower ends are pointed, to prevent them from slipping upon the ground or floor. The lower ends of the bars J may be connected by a round, K, if desired. By adjusting the bars J the frame A can be supported at any desired inclination. For most purposes the inclination should be about forty degrees.

In using the machine the grain is put into the hopper B and allowed to flow down the screen D, the cockle and other small seeds passing through the upper part of the screen D and escaping through the upper spout, F. The smaller kernels of grain pass through the lower part of the screen and escape through the middle spout, F, while the larger plump kernels pass from the lower end of the screen D into the lowest spout, F, through which they escape. As the grain passes down the screen D it is kept in contact with the said screen and prevented from jumping or bounding away from the screen by the flexible aprons I, which also serve to retard the descent of the grain, so that it may be properly separated and graded.

Having thus described our invention, we claim as new and desire to secure by Letters Patent—

The combination of the inclined frame A, forming a chute, the screen D, located therein, the subjacent longitudinal rib or stay E, supporting the middle line of the screen, and the adjustable frame G, provided with cross-bars having flexible aprons I arranged above the screen, substantially as shown and described.

MARTIN B. PARKER.
MYRON T. SMITH.

Witnesses:
ANDREW C. ANDERSON,
S. W. GRAHAM.